United States Patent [19]

Fitzgerald

[11] 4,272,777
[45] Jun. 9, 1981

[54] SERVICE SWITCH APPARATUS

[75] Inventor: William V. Fitzgerald, Indianapolis, Ind.

[73] Assignee: RCA Corporation, New York, N.Y.

[21] Appl. No.: 119,965

[22] Filed: Feb. 8, 1980

[51] Int. Cl.³ .............................................. H04N 9/62
[52] U.S. Cl. ..................................................... 358/10
[58] Field of Search ......................................... 358/10

[56] References Cited

U.S. PATENT DOCUMENTS

| 3,165,639 | 1/1965 | Robinson . | |
|---|---|---|---|
| 3,192,405 | 6/1965 | Patchell . | |
| 4,118,729 | 10/1978 | Shanley | 358/10 |

Primary Examiner—Robert L. Richardson
Attorney, Agent, or Firm—Eugene M. Whitacre; Paul J. Rasmussen; Scott J. Stevens

[57] ABSTRACT

In a television receiver having a vertical oscillator for providing a source of vertical deflection signals to a vertical deflection circuit, a service switch having normal and service positions is coupled to the vertical oscillator through an interference isolating diode. In the normal position, the diode is reverse biased, allowing the oscillator to function normally while eliminating the introduction of signal interference into the oscillator. While in the service position, the switch causes the diode to become forward biased, thereby disabling the oscillator and collapsing the vertical scan.

3 Claims, 1 Drawing Figure

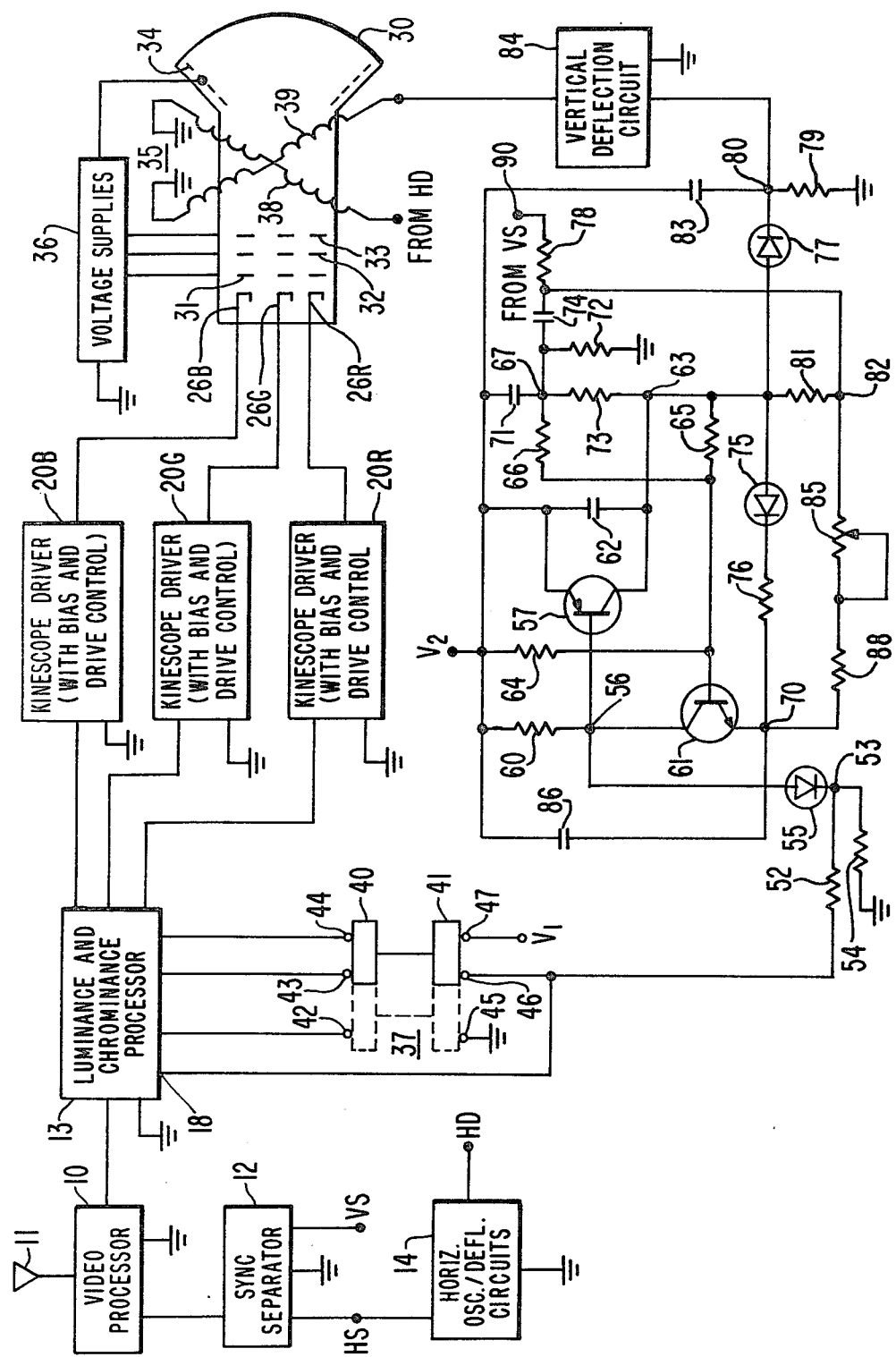

SERVICE SWITCH APPARATUS

This invention relates to a service switch arrangement for a color television receiver in which the service position of the switch couples circuitry to the vertical oscillator for collapsing the vertical scan, while preserving desired interlace performance during normal operations.

Set-up of a color kinescope entails color temperature adjustments among a number of other adjustments. The color temperature adjustment takes into account the differences of the cathode emissions of the several electron beam producing guns of the kinescope and the differences in the efficiencies of the several phosphors of the kinescope. The color temperature adjustment typically involves adjusting direct control voltages applied between cathodes and grids of the kinescope and the AC gain of the kinescope drivers such that white information is reproduced with the proper color temperature at all brightness levels between minimum and maximum white, with the maximum white level being produced at the highest achievable level of brightness consistent with good image clarity.

For proper adjustment, recognizing when electron beam cutoff occurs is critical. Beam cutoff may be difficult to recognize or determine with a full raster scan, so it is common to collapse the vertical scan into a single horizontal line, from which electron beam cutoff can easily be determined.

Service switch arrangements included in color television receivers are known which provide a convenient means for factory and service personnel to make adjustments without the need for additional equipment. Typically, service switch arrangements provide "normal" and "service" positions. When the service switch arrangement is in the "normal" position, the receiver operates to couple video signals to the kinescope for normal image viewing.

When the service switch is in the "service" position, the vertical deflection circuits are disabled and the color signals are decoupled from the kinescope drivers. Fixed reference signals are applied to the drivers in replacement of the normal color signals. The kinescope drivers are adjusted so that the cathode bias level of each gun is such as to produce a barely visible, narrow horizontal line on the kinescope. When all three guns have been so energized, the line will appear as a white line of low brightness level. A further discussion of service switch operation can be found in U.S. patent application Ser. No. 008,171—Shanley, II, entitled "PREDICTABLY BIASED KINESCOPE DRIVER ARRANGEMENT IN A VIDEO SIGNAL PROCESSING SYSTEM" and now U.S. Pat. No. 4,204,221.

One problem which arises with the use of the service switch is that the switch is desirably located near the beam bias and drive adjustments, which may be some distance from the vertical deflection circuitry. This necessitates a long lead from the service switch to the vertical deflection circuit, which may result in the pickup of high frequency horizontal deflection interference by the lead. If this interference becomes coupled into the vertical oscillator, the vertical scanning frequency could shift, adversely affecting alternate field interlace of the scanning electronic beams.

In accordance with the present invention, the coupling between the service switch and the vertical deflection circuits, which is provided so as to permit disabling of vertical deflection during service operations, is effected in a novel manner incorporating protection of the vertical deflection circuits from undesired horizontal frequency interference during normal operations.

In accordance with an illustrative embodiment of the present invention, a diode is coupled between a point in the vertical oscillator cricuit and a contact on the service switch. When the service switch is in the "service" position, a first potential is supplied to the aforesaid service switch contact to effect a forward biasing of the diode, with conduction by the diode effecting a disabling of the vertical oscillator to eliminate vertical scan. When the service switch is in the "normal" position, a second potential is supplied to the aforesaid service switch contact to effect a reverse biasing of the diode. In the absence of conduction by the diode, the vertical oscillator is enabled, permitting normal vertical scanning. Isolation of the oscillator circuitry from horizontal frequency interference picked up by the lead from the service switch is afforded by the high impedance presented by the nonconductive diode during normal operations.

The accompanying drawing illustrates a portion of a color television receiver in schematic and block diagrams, which embodies the service switch arrangement of the present invention.

Referring to the drawing, there is shown a partial circuit for a color television receiver comprising a video processor 10 which receives radio frequency signals through an antenna 11. The video processor 10 translates these signals through amplifying and detecting means to form a composite video signal incorporating luminance, chrominance and synchronizing signals. This composite video signal is applied to a sync separator 12, which separates the horizontal and vertical sync pulses. These pulses are present at terminals HS and VS, respectively. Horizontal sync pulses from terminal HS are coupled to a horizontal oscillator and deflection circuit 14 which develops an appropriate horizontal deflection output waves at terminal HD. The composite video signal is also applied to a luminance and chrominance processor 13. The luminance and chrominance processor 13, in a conventional manner, recovers individual R-Y, G-Y and B-Y color difference signals and combines these signals with a luminance (Y) signal to develop desired red, green and blue color signals.

The blue color signal from processor 13 is coupled to a blue kinescope driver 20B, the green color signal is coupled to a green kinescope driver 20G and the red color signal is coupled to a red kinescope driver 20R. Kinescope drivers 20B, 20G and 20R are coupled to the blue, green and red cathodes 26B, 26G and 26R respectively of an electron gun assembly located within the neck of a color kinescope 30. Kinescope drivers 20B, 20G and 20R amplify their respective color input signals and incorporate respective means for adjusting the bias and drive levels at the respective cathodes. Adjustment of the drive levels determines the gains of drivers 20B, 20G and 20R. Adjustment of the bias level determines the driver output in a quiescent state.

The electron gun assembly also comprises grid structures 31, 32 and 33. In addition to the electron gun assembly, the kinescope 30 also incorporates a high voltage anode 34, located within the tube, and a deflection yoke 35 having horizontal windings 38 and vertical windings 39, disposed about the neck of the tube. Terminal HD of horizontal oscillator and deflection circuits 14 is coupled to horizontal windings 38 of yoke 35. Grid structures 31, 32 and 33 and high voltage anode 34 are electrically connected to voltage supplies 36. Voltage supplies 36 control the voltages applied to the grid structures and the high voltage anode for proper operation of the kinescope 30. The voltages provided by voltage supplies 36 may be developed from horizontal oscillator and deflection circuits 14 in a conventional manner.

The television receiver circuit also comprises a service switch assembly 37. The service switch assembly 37 comprises electrically isolated switch poles 40 and 41 and switch contacts 42, 43, 44, 45, 46 and 47. Contacts 42, 43 and 44 are disposed to be contacted by switch pole 40 and contacts 45, 46 and 47 are disposed to be contacted by switch pole 41. Switch poles 40 and 41 of service switch assembly 37 have two possible switch positions; a normal operating position; and a service position (shown in phantom). In the normal position, switch pole 40 interconnects with switch contacts 43 and 44, and pole 41 interconnects with contacts 46 and 47. In the service position, pole 40 interconnects with switch contacts 42 and 43, while pole 41 interconnects with switch contacts 45 and 46. Contacts 42, 43, 44 and 46 are coupled to luminance and chrominance processor 13. Interconnection of contacts 43 and 44, and contacts 46 and 47 in the switch "normal" position provides normal coupling of the R, G, B color signals to drivers 20B, 20G and 20R. Interconnection of contacts 42 and 43 and contacts 45 and 46 in the switch "service" position causes the color signals to become decoupled from drivers 20B, 20G and 20R and a fixed reference signal to be applied to drivers 20B, 20G and 20R instead. A more detailed description of the service switch operation and connection can be found in the aforementioned U.S. patent application, Ser. No. 008,171—Shanley, II.

Contact 45 is connected to a point of reference potential, i.e., ground, and contact 47 is connected to a point of supply potential, designated as terminal $V_1$. Contact 46 is connected through a resistor 52 to a terminal 53 and to a terminal 18 of luminance and chrominance processor 13. Terminal 53 is coupled through a resistor 54 to ground. Terminal 53 is also connected to the cathode of a diode 55. The anode of diode 55 is connected to a terminal 56. Terminal 56 is connected to the base of a transistor 57, through a resistor 60 to a point of supply potential, designated as terminal $V_2$, and to the collector of a transistor 61.

The emitter of transistor 57 is connected to terminal $V_2$ and through a capacitor 62 to the collector of transistor 57. The collector of transistor 57 is also coupled to a terminal 63. The base of transistor 61 is coupled through a resistor 64 to terminal $V_2$, through a resistor 65 to terminal 63, and through a resistor 66 to a terminal 67. The emitter of transistor 61 is connected to a terminal 70.

Terminal 67 is coupled through a capacitor 71 to terminal $V_2$, through a resistor 72 to ground, through a resistor 73 to terminal 63, and through a capacitor 74 and a resistor 78 to a terminal 90. Terminal 90 is coupled to terminal VS of sync separator 12. Terminal 63 is coupled through a diode 75 (anode-to-cathode) and a resistor 76 to terminal 70, through a diode 77 (anode-to-cathode) to a terminal 80, and through a resistor 81 to a terminal 82. Terminal 80 is coupled through a capacitor 83 to terminal $V_2$, to a vertical deflection circuit 84, and through a resistor 79 to ground. Terminal 82 is coupled through resistor 78 to terminal 90 and through a vertical hold variable resistor 85 and a resistor 88 to terminal 70. Terminal 70 is coupled through a capacitor 86 to terminal $V_2$. The output of vertical deflection circuit 84 is coupled to vertical deflection windings 39 of deflection yoke 35.

With service switch 37 in its service position, terminal 53 is at ground potential which disables the vertical scan to facilitate the bias and drive adjustments. The vertical scan disabling is accomplished in the following manner. Transistors 57 and 61 and capacitor 86 form the basis of a relaxation oscillator. With service switch 37 in its normal position, a voltage is applied to the cathode of diode 55 sufficient to reverse bias it. When the set is initially energized, this causes the base of transistor 57 to rise to a level substantially equal to the $V_2$ supply potential, maintaining transistor 57 in a nonconducting condition. Capacitor 86 is initially discharged, but begins to charge upon energizing of the receiver. Capacitor 86 charges from the $V_2$ supply towards ground through resistor 88, vertical hold variable resistor 85, and resistors 81, 73 and 72. Capacitor 86 will continue charging until the base-emitter junction of transistor 61 becomes forward biased, thereby turning transistor 61 on. Transistor 61 conducts drawing current from the $V_2$ supply through resistor 60. When the current flow through resistor 60 becomes sufficient to forward bias the base emitter junction of transistor 57, transistor 57 turns on. The conduction current of transistor 57 flows through resistor 65, the base-emitter junction of transistor 61 and discharges capacitor 86. Transistors 57 and 61 will remain on and saturated until capacitor 86 discharges to the point where transistor 57 draws insufficient current to remain conductive. Transistor 57 then turns off, thereby turning transistor 61 off. With transistors 57 and 61 off, capacitor 86 begins to charge again, initiating another cycle. During the charging of capacitor 86, corresponding to the trace or scan portion of the vertical deflection cycle, capacitor 83 charges from the $V_2$ supply through resistor 79 to ground. During discharge of capacitor 86, capacitor 83 discharges through the collector-emitter path of transistor 57, diode 77, and resistor 79 to ground. Capacitor 83 forms the actual sawtooth ramp vertical deflection signal. Capacitor 86 acts as a timing element of the oscillator to determine the duration of the deflection cycle trace and retrace portions. Positive-going vertical synchronizing pulses present at terminal 90 from terminal VS of sync separator 12 are integrated by resistor 78, capacitor 74, resistors 81 and 73, and capacitor 71 to remove any horizontal rate interference. The integrated pulses are applied to the base of transistor 61 to turn it on in synchronism with the vertical sync pulses. Absent the sync pulses, the oscillator would oscillate at a frequency slightly lower than the vertical sync rate. This allows the vertical sync pulses to trigger the oscillator each cycle just before transistor 61 would turn on in its free-running state. The sawtooth ramp voltage across capacitor 83 is applied to vertical deflection circuit 84 which drives the vertical deflection windings 39 of the yoke 35 to scan the electron beams across the kinescope display screen.

With service switch 37 in its service position, terminal 53 is grounded, causing diode 55 to become forward biased. This causes transistor 57 to turn on and become saturated, thereby turning on transistor 61. As long as diode 55 remains forward biased, transistors 57 and 61 will remain on, maintaining capacitor 86 in a discharged state. Capacitor 83 therefore remains discharged, no sawtooth ramp signal reaches deflection circuit 84, and no vertical deflection of the electron beams takes place.

A desirable feature of diode 55 is that it operates as a circuit isolating element. While diode 55 is reverse biased in the receiver's normal operating mode, its high impedance isolates the oscillator circuitry from horizontal frequency interference that was picked up in the connection path from service switch 37 to terminal 53, substantially precluding adverse effects on alternate field line interlace. The described service switch arrangement thus permits flexibility in positioning of elements and circuits in the receiver, while providing an effective means for disabling the vertical scan during initial kinescope set-up adjustments.

What is claimed is:

1. In a television receiver including a vertical oscillator for providing a signal to a vertical deflection circuit, service switch apparatus comprising:
    a service switch, incorporating an electrical contact, said switch being adjustable between a first and a second position, said first position defining a condition in which a first potential is applied to said contact, said second position defining a condition in which a second potential, different than said first potential, is applied to said contact;
    a diode;
    means for coupling said diode between a point in said oscillator and said contact with such polarity that application of said first potential to said contact effects a forward biasing of said diode to cause conduction by said diode, said conduction effecting a disabling of said oscillator, whereas application of said second potential to said contact effects a reverse biasing of said diode, permitting normal operation of said vertical oscillator and decoupling said oscillator point from said contact.

2. Apparatus in accordance with claim 1:
    wherein said vertical oscillator comprises a transistor having an input electrode; said transistor, during normal operation of said oscillator, being periodically rendered nonconductive,
    wherein said point in said oscillator comprises said input electrode of said transistor; and
    wherein conduction by said diode maintains said transistor continuously conducting.

3. Apparatus in accordance with claim 2 wherein said transistor has base and emitter electrodes, said input electrode being one of said base and emitter electrodes; said apparatus also including:
    means for applying to the other of said base and emitter electrodes a third potential differing from said first potential such that adjustment of said switch to said first position forward biases the base-emitter path of said transistor via said conducting diode.

* * * * *